C. S. VAN WAGONER.
Shutter-Fasteners.
No. 154,431. Patented Aug. 25, 1874.
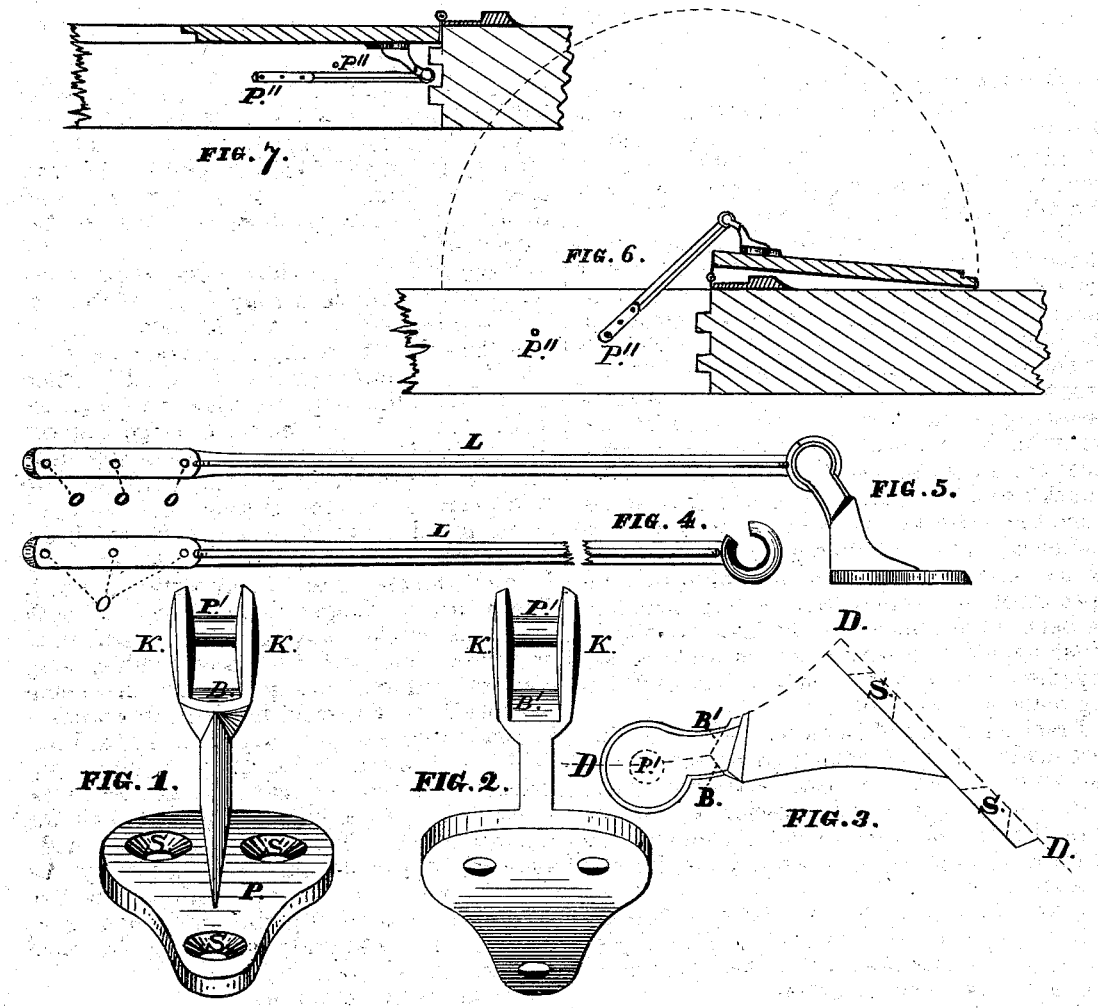
WITNESSES:
James A. Stilton
Thomas Houghton
INVENTOR:
Cornelius S. Van Wagoner

UNITED STATES PATENT OFFICE.

CORNELIUS S. VAN WAGONER, OF BROOKLYN, NEW YORK.

IMPROVEMENT IN SHUTTER-FASTENERS.

Specification forming part of Letters Patent No. 154,431, dated August 25, 1874; application filed June 22, 1874.

CASE B.

*To all whom it may concern:*

Be it known that I, CORNELIUS S. VAN WAGONER, of the city of Brooklyn, county of Kings and State of New York, have invented an Improved Blind-Fastener, of which the following is a specification:

The object of my invention is to provide a cheap and convenient blind-fastening; and it consists, first, in providing a bracket for connecting the long arm of the blind-fastener to the blind, having, instead of the screw-point, as shown in the Letters Patent No. 127,944, granted to me June 11, 1872, as its means of fastening to the blind, a plate in which the screw-holes are cast, and from which plate rises an arm at an angle, having at the end a knuckle-joint, in which the pin is cast at the same time with the plate and arm, and all in one piece; second, in giving the engaging end of the long arm, made of malleable iron, an open hook-like termination, as first made, to be bent around the pin in the knuckle-joint in finishing, so as to secure the arm and bracket together in a working combination, each being made as described.

Brackets for blind-fasteners have been before made with screw-plates cast thereon; but the knuckle-joint has been made sometimes of a bent wire set in the casting, sometimes with the pin inserted in holes bored in the knuckle, the pin being of wrought metal and a separate part.

I am not aware that a solid cast bracket with screw-plate, arm, knuckle-joint, and pin, all of continuous cast metal, has ever been produced before my invention.

Brackets have been also made for this purpose having a screw-point for attaching to the blind. The tendency of a long and extended arm is to unscrew a bracket so secured.

My bracket and arm are both made without machine-work, boring, riveting, &c.

The invention is shown in detail in the drawing, where Figure 1 represents a front view of the bracket, with the plate P provided with screw-holes S, the angular arms A, the knuckle-joint K, and one of the beveled surfaces, B. The knuckle-joint has the pin P' and the ears or flanges F. Fig. 2, a rear view of the bracket, showing the other beveled surface, B'; Fig. 3, a side view of the bracket, showing the line of division of the mold in the dotted lines D D D; Fig. 4, a top view of the long arm L, provided with the holes $o\ o\ o$; Fig. 5, the parts engaged; Fig. 6, a sectional view of the blind, open and held by the fastener; and Fig. 7, the same with the blind closed, showing, also, studs or pins P'' on the window-sill.

The plate P is provided with countersunk screw-holes, and so arranged, in relation to the angular arm and knuckle-joint with its pin, that the whole may be molded together. The two beveled surfaces B and B', which give play to the long arm when attached, are made to accord with the same purpose as the dotted line D passes to their line of juncture. The knuckle-joint K is made with its two sides, ears, or flanges F somewhat enlarged or expanded, so as to give a sufficient bearing or rest for the bent hook of the long arm L, and thereby keep it properly extended. These ears or flanges being placed on both sides, the bracket may be reversed and used as right or left, with the corresponding long arm and without change as they are being put together. The mold in which this bracket is cast is divided, so as to part along the lines D D D. The arm L has three or more pin-holes cast in one end, and also an open hook at the other, to permit engagement with the knuckle-pin P'. These openings being made as nearly in parallel planes as necessary, the arm L may also be cast entire. The two parts are secured together by pinching or driving up, technically upsetting the open hook around the pin P'.

I claim as my invention—

1. The bracket of a blind-fastener, composed of a plate, P, in which the screw-holes S are cast, an angular arm projecting therefrom and terminating in a knuckle-joint, K, provided with a pin, P', cast therein, as shown and described.

2. The long arm L of a blind-fastener, provided with holes $o\ o\ o$ in one end to secure it to the window-sill, and a bent hook at the other, in combination with a bracket cast complete, having a plate with screw-holes, an angular arm, and a knuckle-joint with a pin therein, substantially as set forth.

CORNELIUS S. VAN WAGONER.

Witnesses:
JAMES A. SKILTON,
WM. H. BUTTERWORTH.